United States Patent [19]

Miyagi et al.

[11] 3,837,174
[45] Sept. 24, 1974

[54] CONTROL DEVICE FOR AN ABSORPTION SYSTEM HOT AND COLD WATER SUPPLY APPARATUS

[75] Inventors: Tatsuo Miyagi; Shigeru Sakata, both of Oizumicho, Japan

[73] Assignees: Sanyo Electric Co., Ltd., Osaka; Tokyo Sanyo Electric Co., Ltd., Gunma, both of, Japan

[22] Filed: Mar. 16, 1973

[21] Appl. No.: 341,900

[52] U.S. Cl............... 62/141, 62/148, 62/159, 62/476, 165/63
[51] Int. Cl............................................. F25b 15/06
[58] Field of Search ............ 62/141, 148, 159, 476; 165/63

[56] References Cited
UNITED STATES PATENTS

| | | | |
|---|---|---|---|
| 2,709,346 | 5/1955 | Shagaloff | 165/63 X |
| 3,292,385 | 12/1966 | Murray | 62/159 X |
| 3,363,674 | 1/1968 | Peckham et al. | 62/159 X |
| 3,530,684 | 9/1970 | Porter | 62/148 X |
| 3,605,432 | 9/1971 | Wada | 62/476 |
| 3,710,852 | 1/1973 | Porter | 165/63 X |

Primary Examiner—William F. O'Dea
Assistant Examiner—Peter D. Ferguson
Attorney, Agent, or Firm—Armstrong, Nikaido & Wegner

[57] ABSTRACT

A control device for an absorption system hot and cold water supply apparatus for regulating its refrigerating and heating capacity in order for it to supply hot water and cold water simultaneously corresponding to the loads of hot and cold water, including main and auxiliary proportional controllers, a load detector, changeover switches and devices and apparatus having thermo-control capacity. The complete refrigerant circuit of the apparatus being controlled by the main proportional controller selected by changeover switches owing to the load detector, and at a given time either the hot water circuit or the cold water circuit being controlled by the auxiliary proportional controller connected to one of the circuits independently from the control of the complete refrigerant circuit owing to the main proportional controller.

5 Claims, 1 Drawing Figure

CONTROL DEVICE FOR AN ABSORPTION SYSTEM HOT AND COLD WATER SUPPLY APPARATUS

BACKGROUND OF THE INVENTION

This invention relates to a control device for an absorption system hot and cold water supply apparatus for regulating its refrigerating and heating capacity in order for it to supply hot water and cold water simultaneously in proportion to the hot and cold water loads.

The absorption system hot and cold water supply apparatus is one type of direct fired absorption refrigerating apparatus and may be termed an absorption refrigerating apparatus.

If the load of the hot water circuit or of the cold water circuit varies greatly from the predefined load capacity of the absorption refrigerating apparatus, it is known there are disadvantages when obtaining hot and cold water simultaneously from the absorption system refrigerating apparatus. For example, the action of either the hot or cold water circuit may cease and, owing to absorbent crystal formation, the functioning of the absorption system refrigerating apparatus deteriorates. Thus, it has generally been difficult to use an absorption refrigerating apparatus where there is a significant fluctuation in the load.

SUMMARY OF THE INVENTION

One object of the present invention is to provide a control device for an absorption system hot and cold water supply apparatus to overcome the disadvantages of the prior art mentioned above.

Another object of the invention is to provide a control device for an absorption system hot and cold water supply apparatus, that will regulate it in order for it to supply hot and cold water simultaneously despite a significant fluctuation in the load and in any ratio of the load of hot water an cold water.

According to the present invention, the control device of an absorption system hot and cold water supply apparatus is characterized by devices and apparatus having thermo-control capacity being controlled by the temperature of either the hot water or the cold water that is selected autuomatically by a load detector, by which the operation of the apparatus based on control of the cold water circuit is changed to one based on control of the hot water circuit and vice versa.

BRIEF DESCRIPTION OF THE DRAWINGS

The invention will be further apparent from the following description with reference to the accompanying drawings which illustrate, by way of example only, one form of control device for absorption system hot and cold water supply apparatus.

In the drawings.

DETAILED DESCRIPTION

Figure 1:
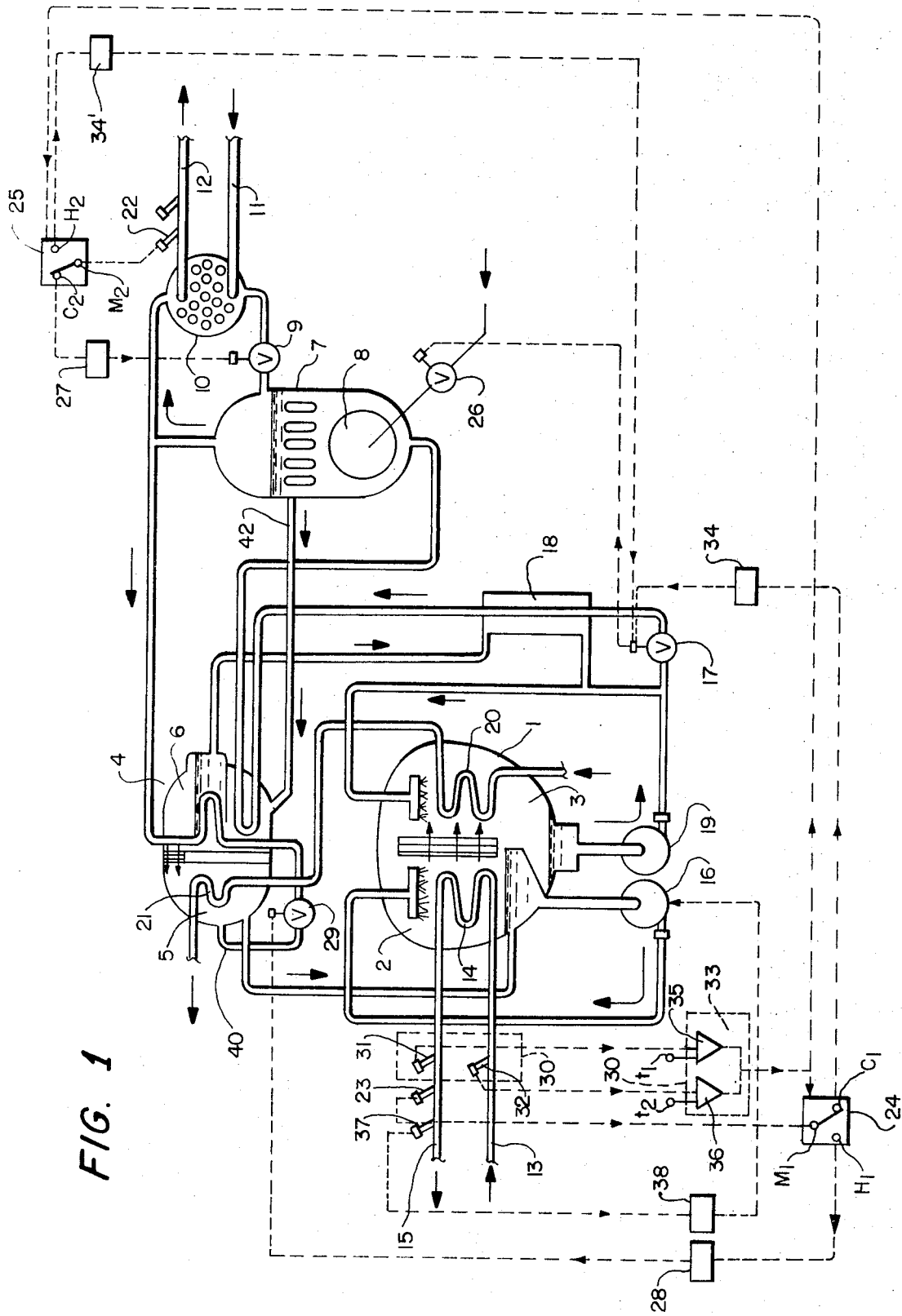
FIG. 1 is a schematic diagram of an absorption system hot and cold water supply apparatus utilizing an automatic control device according to the invention.

The absorption refrigerating machine as used herein comprises an evaporation-absorption unit 1 having evaporator 2 and absorber 3, condensation-generation unit 4 having condenser 5 and low pressure refrigerant generator 6, high pressure refrigerant generator 7 having heater 8, for example, a direct fired generator, hot water unit 10 and heat exchanger 18. Further, control valves 9 and 29 are provided, with valve 9 placed below hot water heat exchange unit 10, and connected between high pressure refrigerant generator 7 and the shell side of hot water heat exchange unit 10. Valve 29 is placed below condensation-generation unit 4 and connected between condenser 5 and high pressure refrigerant generator 7 through low pressure refrigerant generator 6, serving as a second-effect separation zone.

In the apparatus described above, hot water is produced at exit conduit 12 by the heat exchange between the refrigerant vapor in hot water heat exchange unit 10 and the water fed through entrance conduit 11 into the tube side of hot water heat exchange unit 10. Cold water, on the other hand, is produced in heat exchanger 14 located in evaporator 2 by cooling the water fed through an entrance conduit 13.

In operation, a dilute solution comprising a refrigerant and an absorbent, preferably a solution of lithium bromide in water, is poured into high pressure refrigerant generator 7, subsequently heated by heater 8 utilizing preferably combustion heat and separated into refrigerant vapor and a partially-concentrated solution. All or a portion of the refrigerant vapor separated from the absorbent solution is fed to the shell side of hot water heat exchange unit 10, condensed by transferring latent heat to the tube side water and recycled via valve 9 to high pressure refrigerant generator 7. (Necessarily, the tube side water is heated.) Depending upon the amount of recycle (the adjustment of valve 9), all or a portion of the refrigerant vapor generated in high pressure refrigerant generator 7 is fed to low pressure refrigerant generator 6 and then to condenser 5. Concurrently, the partially concentrated solution in high pressure refrigerant generator 7 is passed to low pressure refrigerant generator 6 through conduit 42. In low pressure refrigerant generator 6, the partially-concentrated solution is heated by the refrigerant vapor passing through the tube side and further concentrated resulting in the generation of more refrigerant vapor. The refrigerant vapor generated in low pressure refrigerant generator 6 is mixed in condenser 5 with the refrigerant vapor transferred from high pressure refrigerant generator 7 and condensed. The condensed refrigerant is passed to evaporator 2 and is cycled by refrigerant pump 16 to exchange heat with water passing through the tube side of heat exchanger 14, producing cold water in exit conduit 15.

The refrigerant evaporated in evaporator 2 is absorbed by the absorbent solution in absorber 3, and transferred to the high pressure refrigerant generator 7 through absorbent solution control valve 17 and heat exchanger 18, and separated again from the absorbent solution in high pressure refrigerator generator 7.

In the diagram, symbol 19 indicates a pump which transfers absorbent solution to absorber 3, and the symbols 20 and 21 indicate heat exchangers in which the absorbent solution and refrigerant are cooled by cooling water.

In the absorption system hot and cold water supply apparatus mentioned above, a control device according to the present invention is arranged as follows.

In FIG. 1 exit conduit 12 for the hot water is provided with thermo-detector 22 that detects the temperature of the hot water released from the apparatus while exit conduit 15 for cold water is provided with three thermo-detectors 23, 31 and 37. In addition, entrance conduit 13 for cold water is provided with thermo-detector 32 that detects the temperature of the water fed into heat exchanger 14. Thermo-detector 22 for detecting the exit temperature of the hot water and thermo-detector 23 for detecting the temperature of cold water are connected with fixed contact points $M_1$ and $M_2$ for cooling-heating changeover switches 24 and 25, respectively. Thermo-detector 23 may be connected to either main thermo-controller 34 through cooling contact point $C_1$ or auxiliary thermo-controller 28 through heating contact point $H_1$. And thermo-detector 22 may be connected to either auxiliary thermo-controller 27 through cooling contact point $C_2$ or main thermo-controller 34' through heating contact point $H_2$ of cooling-heating changeover switch 25.

On the other hand, load detector 30 consists of thermo-detector 31 that detects the exit temperature of the cold water, thermo-detector 32 that detects the entrance temperature of the water to be cooled and changeover control comparative device 33. Changeover switches 24 and 25 are operated in parallel motion automatically by load detector 30, thereby connecting fixed contact points $M_1$ and $M_2$ with either cooling contact points $C_1$ and $C_2$ or heating contact points $H_1$ and $H_2$, respectively. And either main thermo-controller 34 or 34', respectively, is controlled by the temperature of the cold water when the load of the cold water circuit is greater than the predefined load or the temperature of the hot water when said load is smaller than the predefined load. Therefore, one of main thermo-controllers 34 and 34', which serves as a proportional controller for the absorbent solution control valve 17 regulating the circulating quantity of absorbent solution and fuel control valve 26 regulating the service quantity of the fuel for heater 8, is controlled selectively by the temperature of either the cold water or the hot water by means of either changeover switch 24 or 25. Further, when thermo-detector 22 or 23 is not connected to main thermo-controllers 34 and 34' but to auxiliary thermo-controller 28 or 27 by means of changeover switch 24 or 25, respectively, the capacity is offered for controlling the cold water circuit or the hot water circuit, which are connected with said auxiliary thermo-controllers 28 or 27, respectively (apart from the thermo-control of all of the circuits which are controlled by main thermo-controller 34 or 34'). For example, the temperature of the hot water and the heating capacity are controlled by means of auxiliary thermo-controller 27 by changing the area of heat conduction of hot water heat exchange unit 10 due to the rise and fall of the refrigerant solution level in the shell side as caused by control valve 9. And the temperature of the cold water and the cooling capacity are controlled by auxiliary thermo-controller 28 by regulating the opening of refrigerant control valve 29, which is arranged in refrigerant conduit circuit 40 located between low pressure generator 6 and condenser 5.

In the action of the control device, thermo-detectors 22 and 23 operate the devices and apparatus having thermo-control capacity in combination with main thermo-controllers 34 and 34'. Thus, these detectors and main thermo-controllers may be generally termed proportional controllers. In other words, the proportional controllers for the cold water circuit and hot water circuits are represented by proportional controller 23–34 and proportional controller 22–34', respectively. When an electric thermo-detector is used, it is generally to obtain an output from the amplifier of the detector that results from the disposition in the amplifier of a main thermo-controller which has the function of proportional control. Therefore, the meaning of the term "porportional controller" is not intended to be limited to the above example only. If necessary, it is possible to use the thermo-detector as the proportional controller separately. Further, the term "devices and apparatus having thermo-control capacity" is used as a general term for the devices and apparatus which control the complete hot and cold water circuit. For example, the term includes absorbent solution control valve 17 and fuel control valve 26. It is, however, possible to achieve the purposes of the invention without setting limits to these valves.

The action of the above control device for the absorption system hot and cold water supply machine will be further apparent from the following description.

When the load of the cold water circuit is greater than a certain quantity — for example, 30 percent of the total hot and cold water load — both fixed contact points $M_1$ and $M_2$ of the changeover switches 24 and 25 are connected with cooling contact points $C_1$ and $C_2$, respectively. Therefore, proportional controller 23 – 34, arranged in the cold water circuit, operates the devices and apparatus having thermo-control capacity such as absorbent solution control valve 17 and fuel control valve 26 and controls the cold water capacity as the proportional control for the total hot and cold water circuits, i.e., complete refrigerant circuit. On the other hand, thermo-detector 22 detects the exit temperature of the hot water and operates auxiliary thermo-controller 27, by which control valve 9 is regulated and causes the rise and fall of the refrigerant solution level in the shell side of hot water heat exchange unit 10 resulting in the change of the area of heat conduction. Thus, the hot water circuit is controlled separately from the proportional control for the complete hot and cold water circuit, thereby hot water having a temperature within a fixed temperature range is obtained.

In addition, when the load of the cold water circuit is less than a certain quantity, changeover switches 24 and 25 are changed automatically by load detector 30, thus causing fixed contact points $M_1$ and $M_2$ to connect with heating contact points $H_1$ and $H_2$, respectively. Therefore, proportional controller 22–34', arranged in the hot water circuit, operates absorbent solution control valve 17 and fuel control valve 26, whereby the thermo-control capacity of the complete refrigerant circuit of the machine is controlled by the temperature of the hot water, serving as an input for the control.

For example, in such case, thermo-detectors 31 and 32 detect the respective exit and entrance temperatures of the cold water, and transmit the detected signals to comparators 35 and 36, in which respective fixed temperatures are predefined, respectively. Accordingly, load detector 30 operates changeover switches 24 and 25 in parallel motion when both the exit and entrance temperatures of the cold water are lower than the respective predefined temperatures $t_1$ and $t_2$, $t_1 < t_2$ — i.e., when the load of the cold water is small — or when both the exit and entrance temperatures of the cold water are higher than the respective predefined temperatures $t_1 + \alpha$, $t_2 + \beta$, — i.e., when the load of the cold water is great.

When the total thermo-control capacity of the hot and cold water supply apparatus is regulated by control of the hot water circuit, the cold water circuit is regulated by the control of the quantity of the refrigerant vapor transferred from low pressure generator 6 to condenser 5; such control being caused by the regulation of the heating capacity of low pressure generator 6 in proportion to the refrigerant vapor which in turn results from the adjustment of refrigerant control valve 29 by auxiliary thermo-controller 28 by means of a thermo-detector for cold water.

Further, when changeover switches 24 and 25 are changed from cooling contact points $C_1$ and $C_2$ to heating contact points $H_1$ and $H_2$, it is desirable to regulate refrigerant control valve 29 by means of the auxiliary thermo-controller 28 as by first closing valve 29 completely and then opening it gradually in response to the rise of the temperature of the cold water and to have protection thermo-detector 37 in the cold water circuit, and protection thermo-controller 38, by which refrigerant pump 16 is stopped when the temperature of the cold water falls below the fixed temperature, for example, 3°C, and the operation of the apparatus is also fully stopped when the temperature of the cold water falls further.

Where both the loads of the hot water and cold water are small and the apparatus is operated primarily by means of control of the hot water circuit, a cam-switch (not shown) that is attached to absorbent solution control valve 17 is operated and then followed by the closing of fuel control valve 26 with the rise of the temperature of the hot water, thereby stopping the operation of the machine. Further, when the apparatus is operated primarily by means of control of the cold water circuit, the exit temperature of the cold water falls to a temperature near the freezing point as the load of the cold water decreases. When the exit temperature of the cold water falls owing to the decrease of the load of the cold water, refrigerant pump 16 is stopped by the action of protection thermo-detector 37 for preventing freezing and the operation of the apparatus is then stopped by the closing of fuel control valve 26 due to the action of the cam-switch in the same manner as the hot water circuit.

Where the manual control device is used for achieving the purposes of the invention, the operation of the machine and the action of the control device are similar to that shown in FIG. 1 except the heating-cooling changeover switches 24 and 25 are operated manually.

According to the present invention, the thermo-control capacity of the complete refrigerant circuit of the hot and cold water supply apparatus is controlled in proportion to the load, stressing the greater load between the load of the hot water and cold water. Therefore, it is possible to supply both hot water and cold water simultaneously and in any ratio without deterioration of the function of the apparatus. Further, when both hot water and cold water are used respectively for heating and cooling, it is possible to change the operation of the apparatus from that stressing cooling to that stressing heating and vice versa, and to control the operation of the apparatus in proportion to the magnitude of the loads of heating and cooling. Thus, the absorption system hot and cold water supply apparatus according to the present invention — i.e., the absorption system hot and cold water supply apparatus utilizing the automatic control device according to the present invention —, as compared with the prior absorption system refrigerating apparatus, has such advantages as simplification of conservation and operation control, and extension of the scope of its use.

While several embodiments of the invention have been shown and described, other variations will be readily apparent to those skilled in the art. Therefore, the invention is not limited to these embodiments but is intended to cover all such variations as may be within the scope of the invention defined by the following claims:

We claim:

1. In a control device for an absorption system hot and cold water supply apparatus for simultaneously supplying hot and cold water having a refrigeration circuit including a direct fired generator controlling the thermo-control capacity of the entire refrigeration circuit and being regulated by a fuel control valve, and hot and cold water circuits associated with said refrigeration circuits such that water in said hot and cold water circuits is repectively heated and cooled by heat exchange with said refrigeration circuit, the improvement comprising a proportional controller means responsive to the thermo-conditions in each of said hot and cold water circuits, each of said proportional controller means being adapted at any given time to control said fuel control valve to control the thermo-control capacity of the entire refrigeration circuit, and thermo-detector means for sensing the thermo-condition of at least one of said hot and cold water circuits and for controlling said thermo-condition of the sensed circuit independently from the control of the thermo-control capacity of the entire refrigeration circuit by means of said fuel control valve.

2. A control device according to claim 1 further comprising selecting means regulated by the magnitude of the load of the cold water circuit and adapted to actuate the proportional controller means associated with the cold water circuit when the load of the cold water circuit is greater than a predetermined load value and to actuate the proportional controller means associated with the hot water circuit when the load of the cold water circuit is less than said predetermined load value.

3. In a control device for an absorption system hot and cold water supply apparatus supplying hot water and cold water simultaneously in proportion to the respective hot and cold water loads having a direct fired generator for heating a dilute solution comprising a refrigerant and an absorbent, a hot water heat exchange unit receiving the heated refrigerant from said generator, a hot water circuit in heat exchange relationship with said hot water heat exchange unit for supplying hot water, condenser means for cooling refrigerant from said generator, an evaporator comprising a cold water heat exchange unit receiving the cooled refrigerant from said condenser means and a cold water circuit in heat exchange relationship with said cold water heat exchange unit for supplying cold water, an absorber and a heat exchanger; the improvement comprising a first control valve regulating the heat provided by said generator; a hot refrigerant control valve for regulating the amount of refrigerant flowing in said hot water heat exchange unit; a cold refrigerant control valve for regulating the amount of refrigerant flowing in said condenser means; a first porportional controller means including a first thermo-detector sensing the thermo-condition of said cold water circuit, a first cooling-heating changeover switch having a fixed contact point and a pair of movable contact points, the fixed contact point being connected to said first thermo-detector and a first main thermo-controller connected to one of said movable point contacts adapted when actuated to regulate said fuel control valve; a first auxiliary thermo-controller connected to the other of said movable point contacts of said first changeover switch adapted when actuated to regulate said cold refrigerant control valve; a second proportional controller means including a second thermo-detector sensing the thermo-condition of said hot water circuit, a second cooling-heating changeover switch having a fixed contact point and a pair of movable contact points, the fixed contact point being connected to said second thermo-detector and a second main thermo-controller connected to one of said movable point contacts adapted when acutated to regulate said fuel control valve; and a second auxiliary thermo-controller connected to the other of said movable point contacts of said second changeover switch adapted when actuated to regulate said hot refrigerant control valve; and changeover control comparative means coupled to said changeover switches, wherein, said movable contact points of said changeover switches are adapted to be changed from one to another in parallel motion such that said fuel control valve is regulated by the first proportional controller means when the cold water load is greater and by the second proportional controller means when the hot water load is greater.

4. A control device according to claim 3 wherein the refrigerant from said hot water heat exchange unit is recycled back to said generator and said hot refrigerant control valve is positioned in the recycle line.

5. A control device according to claim 3 wherein said absorption system hot and cold water supply apparatus is a double-effect system having a low pressure generator between a high pressure generator and said condenser means, said cold refrigerant control valve being located between said low pressure generator and said condenser means.

* * * * *